United States Patent
Koike et al.

(10) Patent No.: US 6,844,973 B1
(45) Date of Patent: Jan. 18, 2005

(54) PLANE DIFFRACTION GRATING BASED ON SURFACE NORMAL ROTATION AND ITS APPLICATION TO AN OPTICAL SYSTEM

(75) Inventors: Masato Koike, Nara-ken (JP); Kazuo Sano, Kyoto-fu (JP); Yoshihisa Harada, Shiga-ken (JP)

(73) Assignees: Japan Atomic Energy Research Institute, Tokyo (JP); Shimadzu Corporation, Kyoto (JP)

( * ) Notice: Subject to any disclaimer, the term of this patent is extended or adjusted under 35 U.S.C. 154(b) by 0 days.

(21) Appl. No.: 09/642,883

(22) Filed: Aug. 22, 2000

(30) Foreign Application Priority Data

Aug. 23, 1999 (JP) ......................................... H11-235848

(51) Int. Cl.[7] ................................................. G02B 5/18
(52) U.S. Cl. ....................... 359/569; 359/571; 359/566; 359/573
(58) Field of Search ................................ 359/569, 566, 359/571, 573, 576

(56) References Cited

U.S. PATENT DOCUMENTS

| | | | |
|---|---|---|---|
| 5,238,785 A | * 8/1993 | Ohkura et al. | ............... 359/577 |
| 5,274,435 A | 12/1993 | Hettrick | |
| 5,528,364 A | 6/1996 | Koike | |
| 5,861,964 A | * 1/1999 | Hasegawa et al. | ........... 359/575 |
| 6,067,197 A | * 5/2000 | Blasiak et al. | ............... 359/571 |
| 6,316,072 B1 | * 11/2001 | Ishikawa | ................... 428/66.5 |

* cited by examiner

*Primary Examiner*—Audrey Chang
(74) *Attorney, Agent, or Firm*—Westerman, Hattori, Daniels & Adrian, LLP

(57) ABSTRACT

A plane diffraction grating based on surface normal rotation according to the present invention is designed so that the profile of the grooves at a radial area is determined depending on a rotational position of the area about a rotational center defined as a foot of the rotational axis on the surface of the plane diffraction grating. An optical system such as a spectrometer or a monochromator according to the present invention uses such a plane diffraction grating, and requires a special arrangement. The optical system includes: a plane diffraction grating as described above; a mechanism for rotating the plane diffraction grating about the rotational axis; an incidence optical system for casting a converging beam of light on a point of the surface of the plane diffraction grating, where the point is set apart from the rotational center. As the diffraction grating is rotated about the rotational center, the point on which the incident converging beam of light is cast rotates about the rotation center, where the diffracting condition is optimized anywhere around the rotational center or for any scanning wavelength. The surface of the plane diffraction grating can be covered with a multiple-layer coating to improve diffraction efficiency. When such a multiple-layer is coated, the unit thickness of the multiple-layer coating at an area is also determined depending on the rotational position of the area about the rotational center.

12 Claims, 3 Drawing Sheets

Fig.2
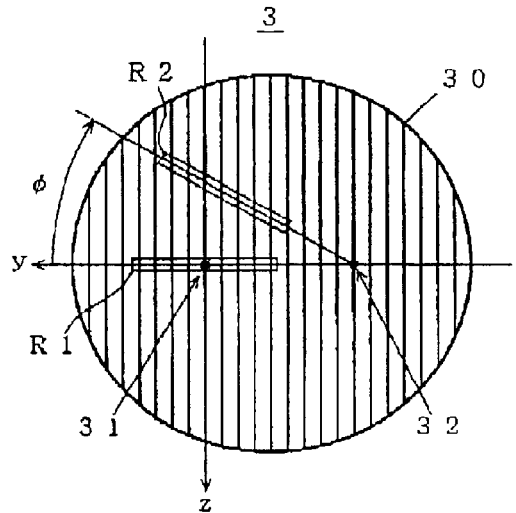
Fig.3A  Profile of grooves in area R1
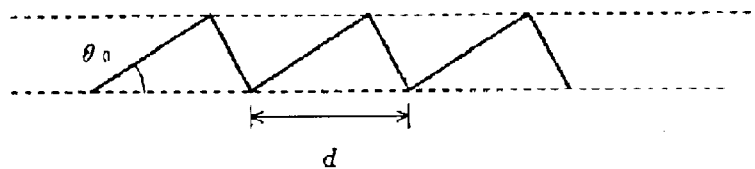
Fig.3B  Profile of grooves in area R2 (in the prior art)
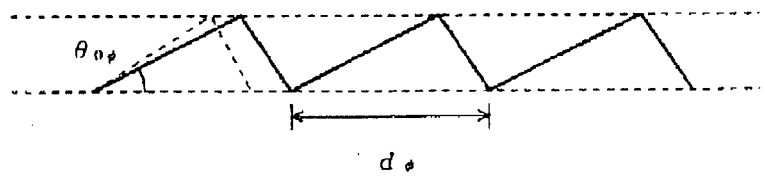
Fig.3C  Profile of grooves in area R2 (in the present invention)
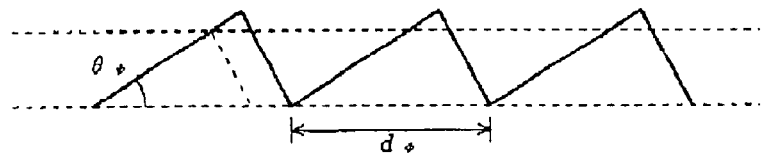

PLANE DIFFRACTION GRATING BASED ON SURFACE NORMAL ROTATION AND ITS APPLICATION TO AN OPTICAL SYSTEM

The present invention relates to a spectrometer or a monochromator based on surface normal rotation, and to a plane diffraction grating optimized for use in such a spectrometer or a monochromator.

BACKGROUND OF THE INVENTION

In designing a diffraction grating employed in a spectrometer or a monochromator, the profile of the grooves should be designed so as to reveal the highest diffraction efficiency as much as possible. In a blazed type diffraction grating having a saw-like profile, for example, the blaze angle should be optimized, and in the laminar type diffraction grating having grooves of a rectangular profile, the depth of the grooves and the duty ratio should be optimized, to obtain the highest diffraction efficiency.

When such a diffraction grating is employed in a constant deviation angle monochromator in which wavelength scanning is done by rotating a diffraction grating about an axis parallel to the grooves of the diffraction grating, however, the diffraction efficiency is maximized only at a certain wavelength but is not maximized at the other wavelengths. Two methods have been proposed addressing the problem. In one of the methods, auxiliary mirrors are used to change the deviation angle according to the wavelength (M. Koike, "High resolution EUV monochromator/spectrometer," U.S. Pat. No. 5,528,364). In the other method, the depth of the grooves of a laminar type diffraction grating is varied along the length of the groove, as shown in FIG. 5. When the diffraction grating is rotated about the rotational axis A for wavelength scanning, the diffraction grating is shifted along the length of the groove (direction B) in synchronous with the rotational angle.

In any of the conventional methods, an auxiliary mechanism is needed besides that for rotating the diffraction grating. In the former case, for example, an appropriate mechanism is needed for properly arranging the auxiliary mirrors, and in the latter case, an appropriate mechanism is needed for moving the diffraction grating along the length of the grooves. In addition to that, a controller for synthesizing two mechanisms at high precision is required.

Another type of monochromator is proposed addressing the same problem in the U.S. Pat. No. 5,274,435, "Grating monochromators and spectrometers based on surface normal rotation" to M. C. Hettrick. In the monochromator, wavelength scanning is done by rotating the diffraction grating about an axis normal to the surface of the diffraction grating and standing at the incident point. In the patented monochromator also the diffraction efficiency is maximized at a certain wavelength, but is not maximized at the other wavelengths.

Thus a primary object of the present invention is to provide such a spectrometer or a monochromator based on surface normal rotation yielding the maximum diffraction efficiency at any wavelength. Another object of the present invention is to provide such a spectrometer with a minimized aberration. Still another object of the present invention is to provide a diffraction grating suited for use in such a spectrometer or a monochromator.

SUMMARY OF THE INVENTION

First, a plane diffraction grating based on surface normal rotation according to the present invention is designed so that the profile of the grooves at a radial area is determined depending on a rotational position of the area about a rotational center defined as a foot of the rotational axis on the surface of the plane diffraction grating.

The surface of the plane diffraction grating can be covered with a multiple-layer coating to improve reflectivity and then diffraction efficiency. When such a multiple-layer is coated, the unit thickness of the multiple-layer coating at a radial area is also determined depending on the rotational position of the area about the rotational center.

An optical system such as a spectrometer or a monochromator according to the present invention uses such a plane diffraction grating described above, and requires a special arrangement. The optical system includes:

a plane diffraction grating as described above;

a mechanism for rotating the plane diffraction grating about the rotational axis;

an incidence optical system for casting a converging beam of light on an area of surface of the plane diffraction grating, where the area is set apart from the rotational center.

The diffraction grating is rotated at a rotational center. The off-axis area from the center of rotation is illuminated by the incident converging beam and optimized to maximize diffraction efficiency for the respective wavelength.

BRIEF DESCRIPTION OF THE DRAWINGS

Further features and examples of the present invention are explained below in the detail description of the embodiments with reference to the drawings in which:

FIG. 2 is a plan view of the plane diffraction grating;

FIG. 3A shows a profile of a blazed type plane diffraction grating at the area R1;

FIG. 3B shows a profile of a conventional blazed type diffraction grating at the area R2;

FIG. 3C shows a profile of an inventive blazed type diffraction grating at the area R2;

DETAIL DESCRIPTION OF THE EMBODIMENTS

Figure 1:
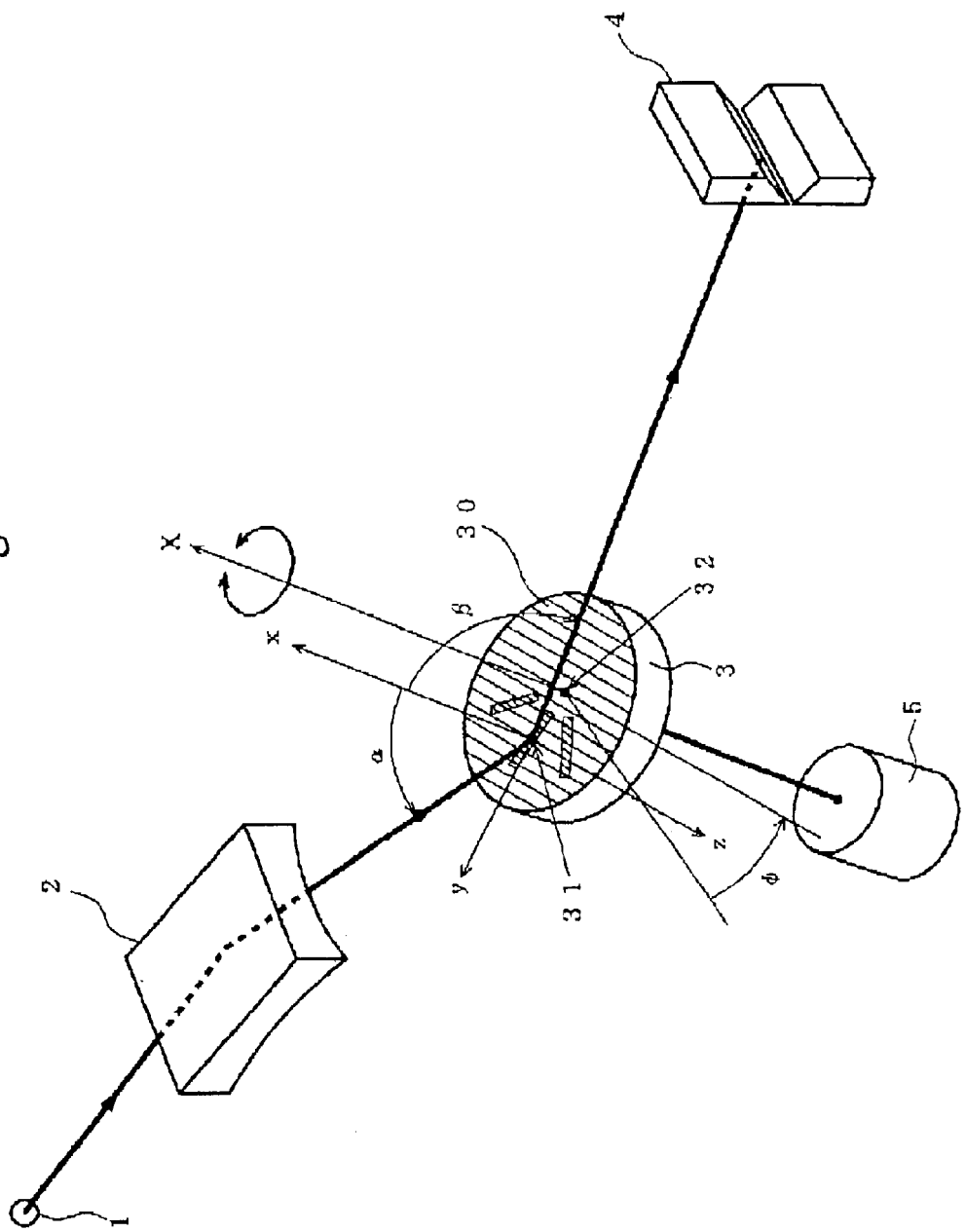
FIG. 1 is a perspective view of an optical system using a plane diffraction grating based on surface normal rotation embodying the present invention.

FIG. 1 shows an example arrangement of basic optical elements constituting a monochromator based on surface normal rotation embodying the present invention. Light beam passing through the entrance slit 1 is reflected by the concave mirror 2 so that the light beam is converted to a beam converging to the exit slit 4. The converging incident light beam strikes the diffraction grating 3 and the diffracted light is focused at the exit silt 4. The diffraction grating 3 is rotated by a grating rotating mechanism 5.

The incident angle at the diffraction grating 3 is denoted as $\alpha$, and the diffraction angle is denoted as $\beta$ in FIG. 1. The x-y-z coordinate system shown in FIG. 1 places its origin at the point of incidence 31 of the principal ray of the incident light beam on the surface 30 of the diffraction grating 3, where the x axis is normal to the surface 30, the y axis is perpendicular to the grooves of the diffraction grating 3, and the z axis is parallel to the grooves. The foot 32 of the rotation axis of the diffraction grating 3 (the point 32 is hereinafter referred to the "rotation center") is set apart from the point of incidence 31. The rotation axis is normal to the surface 30 of the diffraction grating 3 and is parallel to the x axis. The angle φ between the normal to the meridional plane (which includes the incident ray, the point of incidence 30 and the diffracting ray) and the z axis defines the rotational position of the diffraction grating 3. The original position of the rotation (φ=0) is defined as the position where the grooves are perpendicular to the incident ray or perpendicular to the meridional plane.

FIG. 2 shows the surface 30 of the diffraction grating 3. The elongated area R1 on the surface 30 is the area which the incident light beam illuminates when the rotational position of the diffraction grating is 0, and the elongated area R2 is the area which the incident light beam illuminates when the rotational position is φ.

FIRST EXAMPLE

An example using a blazed type diffraction grating is first described referring to FIGS. 2 and 3A–3C. FIG. 3A show the profile of the grooves of the diffraction grating in the area R1, in which the blaze angle is denoted as $\theta_0$, and the grating constant is denoted as d. Supposing the light diffracted by the area R1 has the wavelength $\lambda_0$, it is known that the diffraction efficiency in maximized for the light of wavelength $\lambda_0$ by setting the blaze angle $\theta_0$ as follows:

$$\theta_0 = \frac{\alpha + \beta}{2}. \tag{1}$$

In conventional blazed tape diffraction gratings, the blaze angle is the same throughout the entire surface 30. When such a diffraction grating is used in the above described monochromator, the diffraction efficiency is not maximized for the light of wavelengths other than $\lambda_0$ (or at the position φ≠0). This is explained as follows: When the diffraction grating 3 is at the position φ (≠0) and the incident light beam illuminates the area R2, the profile of the grooves along the length of the area R2 is as shown by FIG. 3B. The light diffracted by the part R2 of the surface 30 has the wavelength λ calculated as $$\lambda = \frac{\lambda_0}{\cos\phi}. \tag{2}$$

As shown in FIG. 3B, the pitch $d_\phi$ of the grooves in the area R2 for the rotational position φ is calculated as $$d_\phi = \frac{d}{\cos\phi}. \tag{3}$$

So the area R2 functions as a blazed type diffraction grating having the blaze angle $\theta_{0\phi}$ calculated by $$\theta_{0\phi} = \sin^{-1}\left(\frac{\sin\theta_0}{\sqrt{1+\tan^2\phi\cos^2\theta_0}}\right). \tag{4}$$

It is clear from the equation (4) that $\theta_{0\phi}$ is smaller than $\theta_0$. As seen in FIG. 1, the incident angle α and the diffraction angle β remain constant while the diffraction grating 3 is rotated (or irrespective of the rotation angle φ). Thus the angle $\theta_{0\phi}$ does not meet with the requirement of equation (1) for the maximum diffraction efficiency.

The present invention is to set the blaze angle $\theta_{100}$ in the area R2 large than the angle $\theta_0$ in order to maximize the diffraction efficiency of the light diffracted by the area R2 and having the wavelength λ. After an intensive study, the inventors revealed that the optimized blaze angle $\theta_{100}$ in the radial area at the rotational position φ for the maximum diffraction efficiency for the light of wavelength λ is denoted as:

$$\theta_\phi = \sin^{-1}\left(\sin\theta_0 \sqrt{\frac{1+\tan^2\phi}{1+\tan^2\phi\sin^2\theta_0}}\right). \tag{5}$$

By setting the blaze angle of the grooves in the area of the rotational position φ at the optimized blaze angle calculated above, the effective blaze angle in the area illuminated by the incident beam of wavelength λ becomes $\theta_0$, as shown in FIG. 3C. Thus the diffraction efficiency is maximized for any scanning wavelength λ.

In conventional monochromators, the diffraction grating 3 is arranged so that the incident point 31 coincides with the rotational center 32. In such an arrangement, the area around the incident point 31 (or the rotational center 32) of the surface 30 of the diffraction grating 3 is always illuminated by the converging beam irrespective of the rotational position φ of the diffraction grating 3. In this case it is impossible to optimize the blaze angle according to the rotational position φ.

The problem is addressed in the present invention by dislocating the incident point 31 from the rotational center 32. In this arrangement the incident area centering the incident point 31 does not cover the rotational center 32 and shifts 4 on the surface 30 according to the rotational position of the diffraction grating 3. Therefore it becomes possible to optimize the blaze angle at every location of the incident point 31.

SECOND EXAMPLE

Another example using a blazed type diffraction grating is then described. The surface of the grooves of the diffraction grating 3 is covered with a multiple-layer coating to improve reflectivity and thus the diffraction efficiency. Suppose the unit thickness of the multiple-layer coating in the linear area R1 at the rotational position φ=0 is $d_{b0}$. In order to improve the diffraction efficiency for the light of wavelength $\lambda_0$, the unit thickness $d_{b0}$ should satisfy the following Bragg equation:

$$m_b \lambda_0 = 2 d_{b0} R_{\alpha 0} \cos(\alpha - \theta_0), \tag{6}$$

where $R_{\alpha 0}$ is given by $$R_{\alpha 0} = \sqrt{1-(2\delta-\delta^2)/\cos^2\alpha}, \tag{7}$$

in which δ=1−n, where n is the average refractive index of the multiple-layer coating for wavelength $\lambda_0$.

In the linear area R2 of the rotational position φ(≠0), the unit thickness $d_{b\phi}$ of the multiple-layer coating for the improved diffraction efficiency for the wavelength λ is calculated as follows: When the rotational position of the diffraction grating 3 is φ, the angle between the incident ray and the normal to the surface of the groove and the angle between the normal and the diffraction ray are derived from equation (1):

$$\alpha - \theta_\phi = -\beta + \theta_\phi. \tag{8}$$

From equation (8), the Bragg equation is denoted as:

$$m_b \lambda = 2 d_{b\phi} R_{\alpha\phi} \cos(\alpha - \theta_0), \quad (9)$$

where $R_{\alpha\phi}$ is given by $$R_{\alpha\phi} = \sqrt{1 - (2\delta_\phi - \delta^2_\phi)/\cos^2\alpha}, \quad (10)$$

in which $\delta_\phi = 1 - n_\phi$, where $n_\phi$ is the average refractive index of the multiple-layer coating for the light of wavelength $\lambda$.

Thus, by forming a multiple-layer coating having such unit thickness on the surface of the grooves of the diffraction grating 3, the diffraction efficiency is improved anywhere on the surface 30 of the diffraction grating 3 and thus for any scanning wavelength $\lambda$.

THIRD EXAMPLE

The present invention is embodied in a monochromator using a laminar type diffraction grating. It is generally known (for example, K. H. Hellwege, Z. Phys. Vol. 106 (1937), pp. 588–596) that the diffraction efficiency for the primary order diffraction light of wavelength $\lambda_0$ is maximized and the diffraction light of even-number orders are decreased by setting the depth $h_0$ of the grooves of the laminar type diffraction grating as:

$$h_0 = \frac{\lambda_0}{2(\cos\alpha + \cos\beta)}. \quad (11)$$

The wavelength $\lambda$ corresponding to the rotational position $\phi$ of the diffraction grating 3 is given by $$\lambda = \frac{\lambda_0}{\cos\phi}. \quad (12)$$

The optimal depth $h_\phi$ of the grooves in the linear area R2 of the rotational position $\phi$ for maximizing the diffraction efficiency is $$h_\phi = \frac{\lambda_0}{2(\cos\alpha + \cos\beta)\cos\phi}. \quad (13)$$

By setting the depth of the grooves in the area R2 at the optimal depth $h_\phi$ given above, the diffraction efficiency is always maximized irrespective of the rotational position of the diffraction grating 3 and for any scanning wavelength $\lambda$.

FOURTH EXAMPLE

Another example using a laminar type diffraction grating is then described. The surface of the grooves of the diffraction grating 3 is covered with a multiple-layer coating to improve the diffraction efficiency. In the present case, however, the angle of incidence and the angle of diffraction are different. Thus the multiple-layer coating should be formed to satisfy the generalized Bragg equation proposed by W. R. Warburton (Nucl. Instru. Meth., A291(1990), pp. 278–285). By the generalized Bragg equation, the optimal thickness $d_{b0}$ of the multiple-layer coating for wavelength $\lambda_0$ (as in the area R1 at the rotational position $\phi=0$) is given by $$m_b \lambda_0 = d_{b0}(R_{\alpha 0} \sin\alpha + R_{\beta 0} \sin\beta), \quad (14)$$

where $$R_{\alpha 0} = \sqrt{1 - (2\delta - \delta^2)/\cos^2\alpha}, \; R_{\beta 0} = \sqrt{1 - (2\delta - \delta^2)/\cos^2\beta}. \quad (15)$$

In equation (15), $\delta = 1 - n$, n being the average refractive index of the multiple-layer coating for wavelength $\delta_0$.

Similarly, the optimal thickness $d_{b\phi}$ of the multiple-layer coating for wavelength $\lambda$ in the area R2 at the rotational position $\phi$ ($\neq 0$) is given by:

$$m_b \lambda = d_{b\phi}(R_{\alpha\phi} \sin\alpha + R_{\beta\phi} \sin\beta). \quad (16)$$

where $$R_{\alpha\phi} = \sqrt{1 - (2\delta_\phi - \delta^2_\phi)/\cos^2\alpha}, \; R_{\beta\phi} = \sqrt{1 - (2\delta_\phi - \delta^2_\phi)/\cos^2\beta}, \quad (17)$$

where $\delta_\phi = 1 - n_\phi$, $n_\phi$ being the average refractive index of the multiple-layer coating for wavelength $\lambda$.

By forming a multiple-layer coating having such unit thickness on the surface of the laminar grooves of the diffraction grating 3, the diffraction efficiency if improved anywhere on the surface 30 of the diffraction grating 3 and thus for any scanning wavelength $\lambda$.

Figure 4:
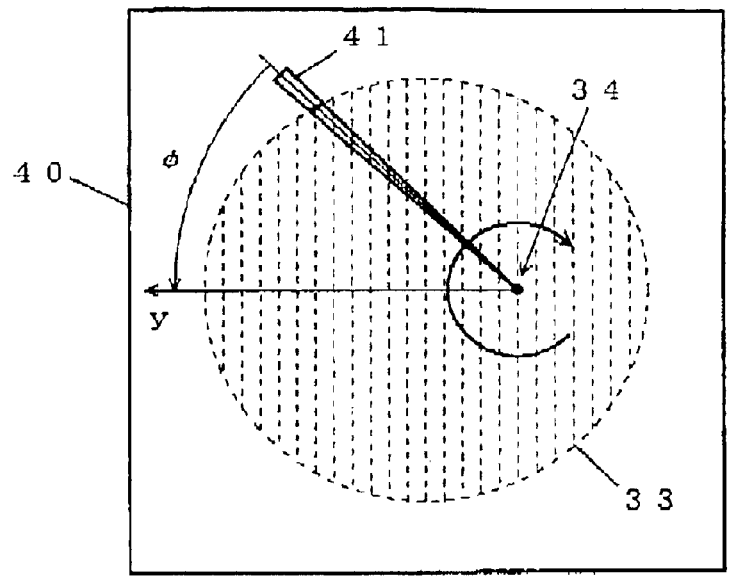
FIG. 4 is a plan view of a substrate and the etching mask while a plane diffraction grating according to the invention is produced.
Figure 5:
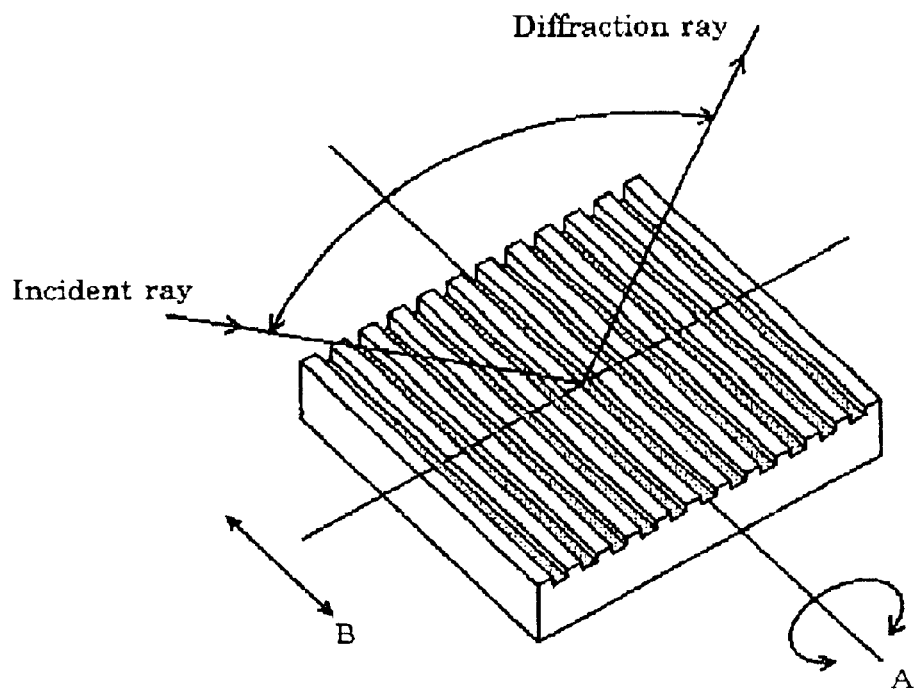
FIG. 5 is a perspective view of a laminar type plane diffraction grating of a conventional type having a progressive groove depth.

Finally, an example of producing a diffraction grating according to the present invention using the ion beam etching method is described referring FIG. 4. A photo-resist layer is coated on the etching surface of a substrate 33 and the pattern of the grooves is formed in the photo-resist layer. Then the etching surface is covered with a mask 40 having an opening 41 of a narrow sector, where the apex of the sector 41 is set at the rotational center 34 of the substrate 33 or the future diffraction grating. The angle $\phi$ between the center line of the opening 41 and the y axis of the substrate 33 (which is defined as perpendicular to the grooves) corresponds to the rotational position $\phi$ of the future diffraction grating 3.

When ion beams are irradiated on the mask 40 with an appropriate etching condition, grooves having an appropriate profile (i.e., an appropriate blaze angle or an appropriate groove depth) according to the theory described above is formed in the opening 41. Then the mask 40 is rotated about the rotational center 34 by the vertex angle of the narrow sector, shifting the opening 41 by the angle. Ion beams are irradiated on the mask 40 with another appropriate etching condition so that the grooves in the opening 41 are formed to have another appropriate profile corresponding to the rotational position of the opening 41, or the linear area described before. Thus the diffraction grating 3 according to the present invention is produced when the opening 41 has swept the surface of the substrate 33.

What is claimed is:

1. A plane diffraction grating with grooves formed on a surface thereof, the plane diffraction grating being rotated about a rotational axis which is normal to the surface, and being characterized in that a profile of the grooves at a radial area is determined depending on an azimuthal position $\phi$ of the area about a rotational center defined as a foot of the rotational axis on the surface of the plane diffraction grating for maximizing a diffraction efficiency of the radial area, wherein the plane diffraction grating is a blazed type, and a blaze angle $\theta_0$ of the grooves in an area along an original line at the azimuthal angle $\phi=0$ which is perpendicular to the grooves is set as:

$$\theta_0 = \frac{\alpha + \beta}{2},$$

where $\alpha$ is an angle of an incident ray from a normal to the surface of the plane diffraction grating in the area, and $\beta$ is an angle of a diffraction ray from the normal, and a blaze angle $\theta_\phi$ of the grooves in an area along a line at the azimuthal position is set as $$\sin\theta_\phi = \sin\theta_0 \sqrt{\frac{1+\tan^2\phi}{1+\tan^2\phi\sin^2\theta_0}}.$$

2. The plane diffraction grating according to claim 1, wherein:
the surface of the plane diffraction grating is covered with a multiple-layer coating to improve reflectivity;
a unit thickness $d_{b\phi}$ of the multiple-layer coating in the area along the original line at the azimuthal angle $\phi$ satisfies the equation:

$$m_b\lambda = 2d_{b\phi}R_{\alpha\phi}\cos(\alpha-\theta_0)$$

where
$m_b$ is the diffraction order,
$\lambda$ is the wavelength of the light diffracted by the area, $$R_{\alpha\phi} = \sqrt{1-(2\delta_\phi-\delta^2_\phi)/\cos^2\alpha},$$

$\delta_\phi = 1 \cdot n_\phi$,
$n_\phi$ is the average refractive index of the multiple-layer coating.

3. A plane diffraction grating with grooves formed on a surface thereof, the plane diffraction grating being rotated about a rotational axis which is normal to the surface, and being characterized in that a profile of the grooves at a radial area is determined depending on an azimuthal position $\phi$ of the area about a rotational center defined as a foot of the rotational axis on the surface of the plane diffraction grating for maximizing a diffraction efficiency of the radial area,
wherein the plane diffraction grating is a laminar type, and a depth $h_\phi$ of the grooves in an area along a line at the azimuthal angle $\phi$ is set as $$h_\phi = \frac{\lambda}{2(\cos\alpha+\cos\beta)\cos\phi}$$

where $\lambda$ is the wavelength of the light diffracted by the area, $\alpha$ is an angle of an incident ray from a normal to the surface of the plane diffraction grating in the area, and $\beta$ is an angle of a diffraction ray from the normal.

4. The plane diffraction grating according to claim 3, wherein:
the surface of the plane diffraction grating is covered with a multiple-layer coating to improve reflectivity;
a unit thickness $d_{b\phi}$ of the multiple-layer coating in the area along the line at the azimuthal angle $\phi$ satisfies the equation:

$$m_b\lambda = d_{b\phi}(R_{\alpha\phi}\sin\alpha + R_{\beta\phi}\sin\beta),$$

where
$m_b$ is the diffraction order, $$R_{\alpha\phi} = \sqrt{1-(2\delta_\phi-\delta^2_\phi)/\cos^2\alpha}, \quad R_{\beta\phi} = \sqrt{1-(2\delta_\phi-\delta^2_\phi)/\cos^2\beta},$$

$\delta_\phi = 1 \cdot n_\phi$,
$n_\phi$ is the average refractive index of the multiple-layer coating.

5. An optical system, comprising:
a plane diffraction grating having grooves on a surface of the plane diffraction grating whose profile at an area is determined depending on an azimuthal position $\phi$ of the area about a rotational center defined as a foot of a rotational axis which is normal to the surface for maximizing a diffraction efficiency at the area;
a mechanism for rotating the plane diffraction grating about the rotational axis;
an incidence optical system for casting a converging beam of light on a point of the surface of the plane diffraction grating, the point being apart from the rotational center,
wherein the plane diffraction grating is a blazed type, and a blaze angle $\theta_0$ of the grooves in an area along an original line at the azimuthal angle $\phi=0$ which is perpendicular to the grooves is set as:

$$\theta_0 = \frac{\alpha+\beta}{2},$$

where $\alpha$ is an angle of an incident ray from a normal to the surface of the plane diffraction grating in the area, and $\beta$ is an angle of a diffraction ray from the normal, and
a blaze angle $\theta_\phi$ of the grooves in an area along a line at the azimuthal position $\phi$ is set as:

$$\sin\theta_\phi = \sin\theta_0 \sqrt{\frac{1+\tan^2\phi}{1+\tan^2\phi\sin^2\theta_0}}.$$

6. The optical system according to claim 5, wherein:
the surface of the plane diffraction grating is covered with a multiple-layer coating to improve reflectivity;
a unit thickness $d_{b\phi}$ of the multiple-layer coating in the area along the original line at the azimuthal angle $\phi$ satisfies the equation:

$$m_b\lambda = 2d_{b\phi}R_{\alpha\phi}\cos(\alpha-\theta_0)$$

where
$m_b$ is the diffraction order,
$\lambda$ is the wavelength of the light diffracted by the area, $$R_{\alpha\phi} = \sqrt{1-(2\delta_\phi-\delta^2_\phi)/\cos^2\alpha},$$

$\delta_\phi = 1 \cdot n_\phi$,
$n_\phi$ is the average refractive index of the multiple-layer coating.

7. An optical system, comprising:
a plane diffraction grating having grooves on a surface of the plane diffraction grating whose profile at an area is determined depending on an azimuthal position $\phi$ of the area about a rotational center defined as a foot of a rotational axis which is normal to the surface for maximizing a diffraction efficiency at the area;
a mechanism for rotating the plane diffraction grating about the rotational axis;
an incidence optical system for casting a converging beam of light on a point of the surface of the plane diffraction grating, the point being apart from the rotational center,
wherein the plane diffraction grating is a laminar type, and a depth $h_\phi$ of the grooves in an area along an original line at the azimuthal angle $\phi$ is set as $$h_\phi = \frac{\lambda}{2(\cos\alpha+\cos\beta)\cos\phi}$$

where $\lambda$ is the wavelength of the light diffracted by the area, $\alpha$ is an angle of an incident ray from a normal to the surface of the plane diffraction grating in the area, and $\beta$ is an angle of a diffraction ray from the normal.

8. The optical system according to claim 7, wherein:
the surface of the plane diffraction grating is covered with a multiple-layer coating to improve reflectivity;
a unit thickness $d_{b\phi}$ of the multiple-layer coating in the area along the line at the azimuthal angle $\phi$ satisfies the equation:

$$m_b \lambda = d_{b\phi}(R_{\alpha\phi} \sin\alpha + R_{\beta\phi} \sin\beta),$$

where
$m_b$ is the diffraction order, $$R_{\alpha\phi} = \sqrt{1-(2\delta_\phi - \delta^2_\phi)/\cos^2\alpha}, \; R_{\beta\phi} = \sqrt{1-(2\delta_\phi - \delta^2_\phi)/\cos^2\beta},$$

$\delta_\phi = 1-n_\phi$,
$n_\phi$ is the average refractive index of the multiple-layer coating.

9. A method of producing a plane diffraction grating having grooves on a surface thereof whose profile at an area is determined depending on an azimuthal position $\phi$ of the area about a rotational center defined as a foot of a rotational axis for maximizing a diffraction efficiency of the area, the method comprising the steps of:
coating a substrate with a photo-resist layer and forming a photo-resist mask from the photo-resist layer according to a preset pattern of groove arrangement;
covering the photo-resist mask with a sector mask having an opening of a narrow sector whose apex is set at the rotational center;
etching the substrate over the sector mask with an appropriate etching condition depending on a rotational position of the sector mask about the rotational center;
rotating the sector mask by an angle of the apex of the narrow sector; and
repeating the etching process and the mask rotating process until the narrow sector sweeps the surface of the substrate,
wherein the plane diffraction grating is a blazed type, and the etching condition in the etching process is such that:
a blaze angle $\theta_0$ of the grooves in an area along an original line at the azimuthal angle $\phi=0$ which is perpendicular to the grooves is set as $$\theta_0 = \frac{\alpha+\beta}{2},$$

where $\alpha$ is an angle of an incident ray from a normal to the surface of the plane diffraction grating in the area, and $\beta$ is an angle of a diffraction ray from the normal, and
a blaze angle $\theta_\phi$ of the grooves in an area along a line at the azimuthal position $\phi$ is set as $$\sin\theta_\phi = \sin\theta_0 \sqrt{\frac{1+\tan^2\phi}{1+\tan^2\phi \sin^2\theta_0}}.$$

10. The plane diffraction grating producing method according to claim 9, wherein the surface of the plane diffraction grating is then covered with a multiple-layer coating to improve reflectivity, and:
a unit thickness $d_{b\phi}$ of the multiple-layer coating in the area along the original line at the azimuthal angle $\phi$ satisfies the equation:

$$m_b \lambda = 2d_{b\phi} R_{\alpha\phi} \cos(\alpha - \theta_0)$$

where
$m_b$ is the diffraction order,
$\lambda$ is the wavelength of the light diffracted by the area, $$R_{\alpha\phi} = \sqrt{1-(2\delta_\phi - \delta^2_\phi)/\cos^2\alpha},$$

$\delta_\phi = 1-n_\phi$,
$n_\phi$ is the average refractive index of the multiple-layer coating.

11. A method of producing a plane diffraction grating having grooves on a surface thereof whose profile at an area is determined depending on an azimuthal position $\phi$ of the area about a rotational center defined as a foot of a rotational axis for maximizing a diffraction efficiency of the area, the method comprising the steps of:
coating a substrate with a photo-resist layer and forming a photo-resist mask from the photo-resist layer according to a preset pattern of groove arrangement;
covering the photo-resist mask with a sector mask having an opening of a narrow sector whose apex is set at the rotational center;
etching the substrate over the sector mask with an appropriate etching condition depending on a rotational position of the sector mask about the rotational center;
rotating the sector mask by an angle of the apex of the narrow sector; and
repeating the etching process and the mask rotating process until the narrow sector sweeps the surface of the substrate,
wherein the plane diffraction grating is a laminar type, and the etching condition in the etching process is such that:
a depth $h_\phi$ of the grooves in an area along a line at the azimuthal angle $\phi$ is set as $$h_\phi = \frac{\lambda}{2(\cos\alpha + \cos\beta)\cos\phi}$$

where $\lambda$ is the wavelength of the light diffracted by the area, $\alpha$ is an angle of an incident ray from a normal to the surface of the plane diffraction grating in the area, and $\beta$ is an angle of a diffraction ray from the normal.

12. The plane diffraction grating producing method according to claim 11, wherein the surface of the plane diffraction grating is then covered with a multiple-layer coating to improve reflectivity, and:
a unit thickness $d_{b\phi}$ of the multiple-layer coating in the area along the line at the azimuthal angle $\phi$ satisfies the equation:

$$m_b \lambda = d_{b\phi}(R_{\alpha\phi} \sin\alpha + R_{\beta\phi} \sin\beta),$$

where
$m_b$ is the diffraction order, $$R_{\alpha\phi} = \sqrt{1-(2\delta_\phi - \delta^2_\phi)/\cos^2\alpha}, \; R_{\beta\phi} = \sqrt{1-(2\delta_\phi - \delta^2_\phi)/\cos^2\beta},$$

$\delta_\phi = 1-n_\phi$,
$n_\phi$ is the average refractive index of the multiple-layer coating.

* * * * *